(12) United States Patent
Gamble et al.

(10) Patent No.: US 12,079,813 B2
(45) Date of Patent: Sep. 3, 2024

(54) SYSTEM AND METHOD FOR IDENTIFYING SUSPICIOUS DESTINATIONS

(71) Applicant: ROYAL BANK OF CANADA, Toronto (CA)

(72) Inventors: Jamie Gamble, Toronto (CA); Gadi Shpits, Toronto (CA); Ilya Kolmanovich, Toronto (CA); Cormac O'Keeffe, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 0 days.

(21) Appl. No.: 17/162,039

(22) Filed: Jan. 29, 2021

(65) Prior Publication Data
US 2021/0241281 A1    Aug. 5, 2021

Related U.S. Application Data

(60) Provisional application No. 62/968,192, filed on Jan. 31, 2020.

(51) Int. Cl.
*G06Q 20/40* (2012.01)
*H04L 9/40* (2022.01)
(52) U.S. Cl.
CPC ..... *G06Q 20/4016* (2013.01); *G06Q 20/4014* (2013.01); *H04L 63/0876* (2013.01); *H04L 63/102* (2013.01)

(58) Field of Classification Search
CPC ............ G06Q 20/4014; G06Q 20/4016; H04L 63/0876; H04L 63/102
See application file for complete search history.

(56) References Cited

U.S. PATENT DOCUMENTS

| 8,170,953 | B1 * | 5/2012 | Tullis | G06Q 20/085 705/77 |
| 9,767,449 | B2 * | 9/2017 | Brody | G06Q 20/26 |
| 10,104,113 | B1 * | 10/2018 | Stein | H04L 63/1425 |
| 10,567,402 | B1 * | 2/2020 | Comeaux | G06F 16/951 |
| 2016/0239831 | A1 * | 8/2016 | Saunders | G06Q 20/40145 |
| 2018/0197182 | A1 * | 7/2018 | Nidamanuri | G01C 21/3407 |

\* cited by examiner

*Primary Examiner* — Elda G Milef
*Assistant Examiner* — Bhavin D Shah
(74) *Attorney, Agent, or Firm* — Norton Rose Fulbright Canada LLP

(57) ABSTRACT

Transaction destinations are identified by identifying requests for a login page of a web server for a financial institution and determining a referring website for each of the requests; classifying the referring websites into classes, each of the classes having a risk rating; identifying logins to access the web server and determining a user associated with each login; associating each of the logins with one of the requests and the referring website for that request; for each of the users, identifying transactions occurring within a time period from when the login was initiated; for each of the transactions occurring within the time period, associating a transaction destination of that transaction with the referring website for that login; and assigning a risk rating to each of the transaction destinations based at least in part on a risk rating of the class of the associated referring website.

21 Claims, 3 Drawing Sheets

SYSTEM AND METHOD FOR IDENTIFYING SUSPICIOUS DESTINATIONS

CROSS-REFERENCE TO RELATED APPLICATION(S)

This application claims priority from U.S. Provisional Patent Application No. 62/968,192 filed on Jan. 31, 2020, the entire contents of which are hereby incorporated by reference herein.

FIELD

This disclosure relates to computer security, in particular to identification of suspicious online transactions and transaction destinations.

BACKGROUND

Online financial transactions (for example, email money transfers or online credit card payment processors) have created a means to facilitate online payments between entities such as individuals and organizations.

Due to obfuscation and other techniques to modify identifying information, it can be a challenge to identify when a transaction destination (for example, email address, telephone number, or bank account number) are linked to a suspicious entity.

SUMMARY

According to an aspect, there is provided a computer-implemented method for identifying transaction destinations, comprising: identifying requests for a login page of a web server for a financial institution and determining a referring website for each of the requests; classifying the referring websites into classes, each of the classes having a risk rating; identifying logins to access the web server and determining a user associated with each login; associating each of the logins with one of the requests and the referring website for that request; for each of the users, identifying transactions occurring within a time period from when the login was initiated; for each of the transactions occurring within the time period, associating a transaction destination of that transaction with the referring website for that login; and assigning a risk rating to each of the transaction destinations based at least in part on a risk rating of the class of the associated referring website.

In some embodiments, the determining the referring website comprises extracting an identifier of the referring website web server logs from the financial institution.

In some embodiments, the requests are HTTP requests.

In some embodiments, the determining the referring website comprises extracting an identifier of the referring website from HTTP referrer header information.

In some embodiments, the associating each of the logins with one of the requests and the referring website for that request is based at least in part on comparing a time stamp of the login and a time stamp of the request.

In some embodiments, the associating each of the logins with one of the requests and the referring website for that request is based at least in part on a cookie upon login linking an account of the user with a browser of the user.

In some embodiments, the determining the user associated with each login is based at least in part on an IP address in a web server log.

In some embodiments, the determining the user associated with each login is based at least in part on an IP address in a HTTP request.

In some embodiments, the method further comprises grouping users from a common class of the referring websites and identifying, for each of the groups of users, a common transaction destination.

In some embodiments, the common transaction destination is identified from the destinations containing a common word.

In some embodiments, the time period is between ten and thirty minutes.

In some embodiments, the time period is twenty minutes.

In some embodiments, the risk ratings of the classes are based at least in part on a whitelist of websites.

In some embodiments, the transaction destination of at least one of the transactions is an identification of an entity.

In some embodiments, the transaction destination of at least one of the transactions is a bank account.

In some embodiments, the method further comprises identifying additional transactions that send funds to one or more of the transaction destinations.

In some embodiments, the method further comprises assigning a risk rating to the additional transactions based at least in part on the risk ratings of the transaction destinations.

In some embodiments, the method further comprises for each of the transactions, identifying a transaction type and assigning a risk rating to the transaction type based at least in part on the risk rating of the transaction destination.

According to another aspect, there is provided a computer system comprising: a processor; and a memory in communication with the processor, the memory storing instructions that, when executed by the processor cause the processor to perform a method as disclosed herein.

According to a further aspect, there is provided a non-transitory computer-readable medium having computer executable instructions stored thereon for execution by one or more computing devices, that when executed perform a method as disclosed herein.

Other features will become apparent from the drawings in conjunction with the following description.

BRIEF DESCRIPTION OF DRAWINGS

In the figures which illustrate example embodiments.

DETAILED DESCRIPTION

Electronic financial transactions can be used to administer online payment between parties through an electronic medium.

To facilitate an electronic financial transaction between parties, such as a client and a merchant, an entity or website requesting a payment may forward the client from their present location, or a referring website, to a website of a bank or financial institution of their choice to initiate the transaction.

Upon activation of a link or URL to a website, or when content (such as JavaScript, images, or CSS files) is requested from a web server in a web browser, the browser sends a request, such as an access request or login request, to the web server, which includes a HTTP referrer header. The HTTP referrer header can include the absolute or partial address of a referring website, namely, the previous web page from which a link to the currently requested page was followed.

Systems and methods described herein provide a model, which in some embodiments can incorporate machine learning techniques, to identify destinations of financial transactions based at least in part on information such as HTTP referrer header data obtained from sources identified herein.

In some embodiments, transaction destinations receiving fund transfers may be flagged or identified as entities that a financial institution does not wish to engage with, for example, destinations associated with illegal activity, grey-market activity, gambling activity or cryptocurrency exchanges.

Embodiments disclosed herein can associate or link three types of data: (i) referral information related to website traffic (from a referring website), (ii) login information relating to an online banking (OLB) account; and (iii) a destination for a payment or transaction, including, but not limited to, an email address, a bank account, or an entity.

Figure 1:
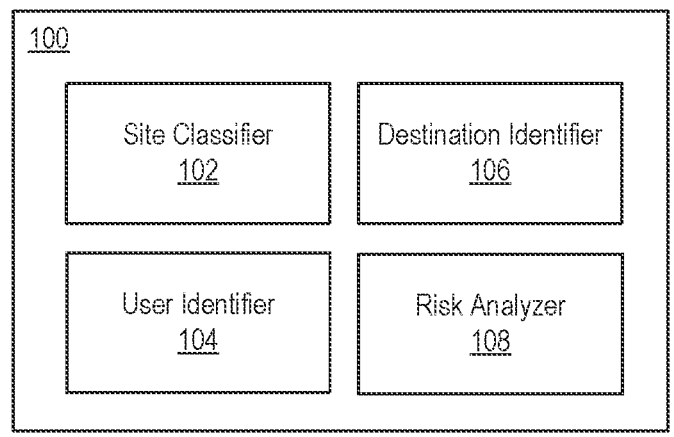
FIG. 1 is a simplified schematic diagram of an identification system, according embodiment.

FIG. 1 illustrates an identification system 100, in an embodiment. Identification system 100 includes a site classifier 102, a user identifier 104, a destination identifier 106 and a risk analyzer 108.

Site classifier 102 can be configured to identify requests from users to access a web server of a financial institution. For example, requests for a login page of a web server for a financial institution can be identified, and a referring website determined for each of the requests.

Site classifier 102 of identification system 100 can obtain data that is used to identify referring websites that send such access requests to a web server associated with a financial institution or online banking (OLB) server, such as from the source types listed below:

Apache (HTTP/web server) logs from financial institution or OLB servers (requested page, referrer header, time, Internet Protocol (IP) address of client).

OLB account login information (user, source IP, time).

Transaction information for OLB account users (account name, transaction history with time and destination recipient).

HTTP referrer header information that can be extracted from a web server log file.

HTTP referrer header or similar information that can be obtained from other suitable sources, for example, third-party logs of a financial network such as SWIFT™ or Interac™.

Other suitable data sources may also be contemplated.

In some embodiments, data from the above data sources can be collected in either real-time or in batches.

An HTTP referrer header can specify the remote website or web page that preceded the request, namely, a referring website.

In an example, site classifier 102 can extract, from Apache logs or other sources described herein, referrer header, request time and source IP information relating to referring websites that have sent a request to or accessed an OLB server.

Thus, it may be possible identify referring websites from which a request is sent to an OLB server, to generate a list of referring websites.

In some embodiments, an identified referring website can be compared to a whitelist and removed from the list of referring websites, and thus removed from further consideration or analysis by identification system 100, if the identified referring website is on a list of "known good" sites.

Once referring websites have been identified, for example, from referrer header information, data may be enhanced with a site type classification or risk rating for the domain or IP address of the referring websites.

Site classifier 102 may classify referring websites into classes or categories, with a risk rating associated with each class. A class may be a categorization of a website to provide a inference as to where a user is navigating from.

In some embodiments, the classification of a referring website is to a "blacklist" or "whitelist", based on information on the referring website, in an example, obtained from an internal or external source.

Site classifier 102 may obtain information from a classification system (e.g., blue coat site classification logs) or risk ratings system (e.g., a vendor product for calculating a risk score) for information relating to a classification or risk rating of various IP addresses and domains.

In some embodiments, site classifier 102 can classify referring websites into classes based on a list of suspicious websites or firewall information. Such a list of suspicious websites may be received from a data source such as a classification system or risk ratings system, or a website classification list generated using suitable security tools. A suitable firewall may provide a list of suspicious websites, and referring websites can be classified accordingly.

Classification of referring websites may be done on the basis of a risk rating assigned to a high level domain of the referring website, such as a likelihood of it being a phishing site, or classification of a domain for example, by a category of business type or types of sites of interest.

In some embodiments, site classifier 102 can classify referring website based on information associate a website as belonging to a particular industry.

In some embodiments, site classifier 102 may scan a referring website to extract certain keywords or information about the website, and based on such information, using techniques such as natural language processing, identify an industry, or associated use of the website to classify the referring website accordingly. For example, based on a site name or domain name, it may be possible to infer an industry of the website (for e.g., adult content, drug use).

A risk rating associated with a referring website can be based on an assessment of the referring website as being associated with or owned by entities an institution wants to do business with, a blacklist of entities (such as people or countries that a financial institution cannot do business with), identified illegal companies, entities or businesses that are banned by a financial institution, or if the referring website has a defined legal, reputation or regulatory risk.

User identifier 104 of identification system 100 may be configured to identify logins that access the web server of a financial institution and determine a user associated with each login. A user or an OLB client or account associated with a login request, and hence a referring website from which the login page was referred, can be determined, for example, based at least in part on the HTTP request that contained the referrer header from the access request to the OLB, such as to access a login page.

User identifier 104 can associate each of the logins with one of the requests for a login page and also be associated with the referring website for that request.

In some embodiments, user identifier 104 can determine a time stamp associated with the HTTP request and IP address, for example, from an Apache log.

The time stamp can then be correlated or associated with user logins to the OLB to identify users who logged into OLB within a time period (for example, 30 minutes) in proximity to the time stamp.

In an example, a user login can be identified on the basis of a session ID associated with a login, when a user has logged into an OLB account, which is then associated with an IP address that can be linked to IP address information in a referral header. Thus, an IP address can be linked to a user or client to identify the user.

In some embodiments, a cookie passes data from the OLB server to the user's web browser when a user logs in to the OLB server, that links a client account, and thus the user, with the user's web browser. The cookie can be sent back to the server to identify the user while accessing the OLB server. Thus, cookie data can be linked to a user or client to identify the user or their account.

User identifier 104 can be further configured to compile a list of transactions that sent money to destinations outside of the financial institution (for example, email money transfers, SWIFT™ transactions) made from an account associated with a user within a time window after the login occurred.

In some embodiments, for each of the users, user identifier 104 identifies transactions occurring within a time period from when the login was initiated.

The time window of interest may be after a user has logged into the OLB server, and be used to identify transactions that a user performs following login, for example, between ten and thirty minutes (for e.g., twenty minutes), within the following hour, hours, day or multiple days, for example, ten days.

User identifier 104 can thus generate a list of users who were referred to (for example, redirected or followed a link) to the financial institution's web server, and an associated list of transactions initiated by the user.

User identifier 104 can further group all of the users from a particular referring site, for example, that meets a criteria, or one or more referring websites in a common class that have a site classification that meet a particular criteria, such as suspicious (e.g., the domain has a high risk rating or the domain type of interest).

Destination identifier 106 can identify transactions associated with the users within a time window of when access requests were received from referring websites, to link a transaction, and thus a destination of the transaction, to a referring website.

For each access request, transactions can be identified that occur within a time period of when the access request was initiated. For each of the transactions and occurring within the time period from login, a destination of that transaction can be associated with the referring website for that login, and thus user or account, and referring website.

A "destination" for a financial transaction can be understood as being an entity, an individual, an email address (for example, in the context of an Interac email transfer that may be ultimately linked to a bank account to which funds are deposited), a mailing address, a telephone number, a bank account, or other suitable identifier.

Destination identifier 106 can be configured to, for each user or group of users (and their transaction histories) linked to a referring website, identify if there is a common destination of a financial transaction or transfer between them or a common financial transaction type. In some embodiments, an algorithm can be used for clustering to group and identify a common destination.

Identification of a common destination may involve using data science models such as natural language processing techniques to determine similarities between domains, graph based databases, and the like.

In an example, natural language processing techniques may be utilized build a model to detect what domain names are related to a particular category of use. For example, such natural language processing techniques could be used to identify keywords in a domain name (e.g., slang words) that would be common for a category, which may conveniently reduce false positives and increase confidence in identifying which types of referring websites are similar or related entities.

In some embodiments, a common transaction destination can be identified from destinations containing a common word.

Transaction destinations can be grouped together as a common destination, in an example, by having the same or similar email addresses (for example, with the same domain name), destinations that are linked to the same account where funds are deposited (for example, multiple email addresses that deposit to the same bank), login information of who logged into a financial institution, or money transfer logs, such as Interac.

In some embodiments, a single entity or transaction destination can be associated with multiple different email addresses and a single bank account or owned by the same individual. In some embodiments, a single entity or transaction can be associated with a single email address and multiple bank accounts, which may be linked by a referring website as disclosed herein.

A login can be linked or associated with a transaction, and in particular, a transaction destination. Such a transaction destination can then be associated with a referring website, based at least in part on the login (and/or user) used for the transaction.

A login and/or a user can be associated with a single transaction destination, or a common destination or grouping of destinations.

Destination identifier 106 can be further configured to compile a list with links between referring websites with a financial transaction destination.

Risk analyzer 108 can be configured to assign a risk rating or score for a particular transaction, or a transaction destination or transaction type, based at least in part on a risk rating of an associated referring website, for example, to flag a transaction as suspicious, if the associated referring website is also flagged as suspicious.

In some embodiments, a risk rating for a transaction destination is correlated with a risk rating of a referring website.

Transactions or transaction destinations with a particular risk rating may be blocked, in some embodiments, or flagged for further review, and can be identified as destinations with which the financial institution does not want to do business, or which should be referred to a law enforcement agency.

Based on an identification of certain transaction destinations or types as suspicious, or with a particular risk rating, risk analyzer 108 can be configured to determine if other users or clients initiate transactions that send funds to such suspicious financial destinations, and to assign a risk rating to such a transaction to be further processed or reviewed by systems that approve or deny transactions. Risk analyzer 108 can thus identify and flag additional transactions that send funds to one or more of the destinations.

Newly initiated financial transactions to a flagged destination may be directed to a manual review process for anti-money laundering or fraud review.

In some embodiments, risk analyzer 108 may also send a list of suspicious transaction destinations, or transaction destinations and their associated risk rating, and the associated referring websites to an analyst or other location for review.

If a review, for example, performed by an analyst, indicates that a referring website is linked to a group that does not warrant additional scrutiny add it to a whitelist that can be checked by site classifier 102.

Similarly, a review may indicate that a transaction destination does not warrant additional scrutiny, and can be whitelisted.

Figure 2:
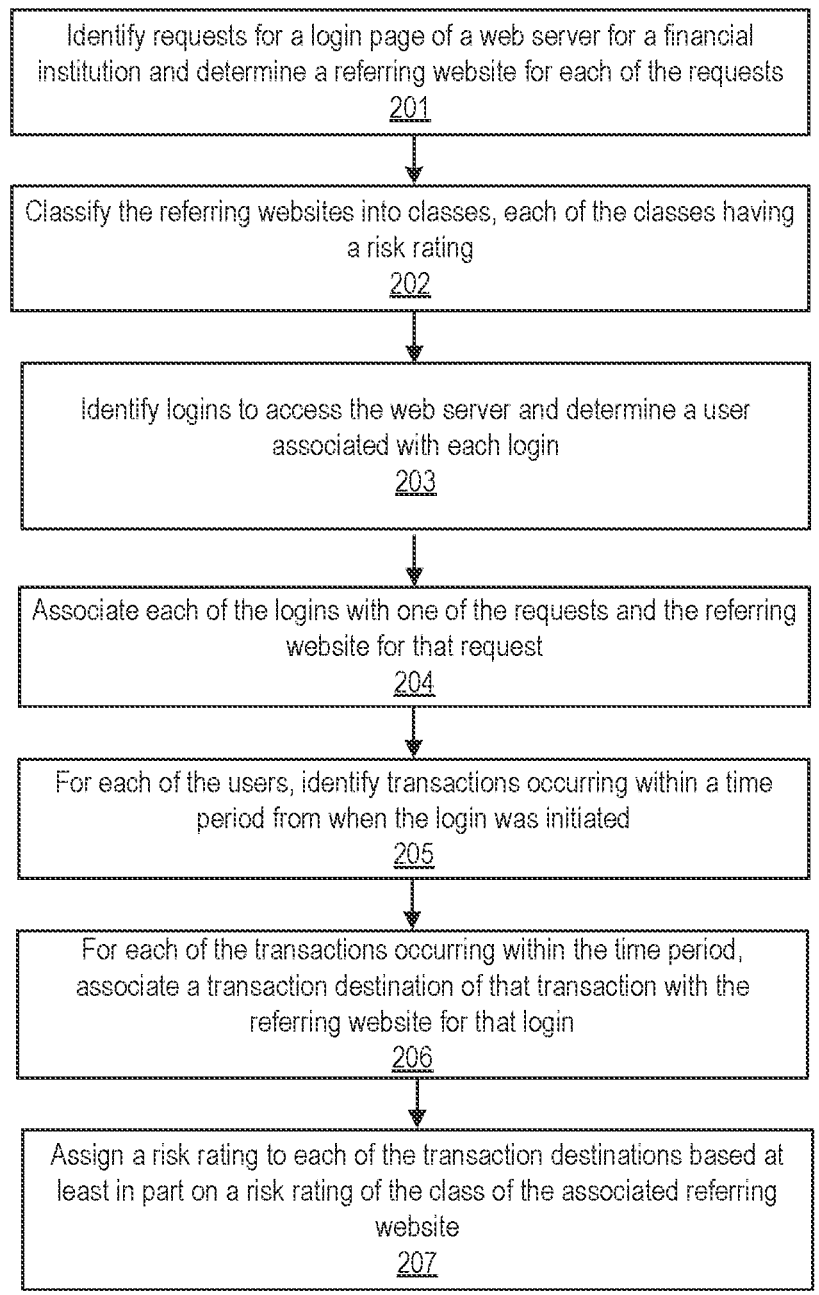
FIG. 2 is a flow chart of a method for identifying transaction destinations, according an embodiment.

FIG. 2 illustrates a flow chart of a method 200 for identifying transaction destinations, according to an embodiment. The steps are provided for illustrative purposes. Variations of the steps, omission or substitution of various steps, or additional steps may be considered.

At block 201, site classifier 102 identifies requests for a login page of a web server for a financial institution and determines a referring website for each of the requests.

In some embodiments, determining the referring website comprises extracting an identifier of the referring website web server logs from the financial institution.

In some embodiments, the requests are HTTP requests.

In some embodiments, determining the referring website comprises extracting an identifier of the referring website from HTTP referrer header information.

At block 202, site classifier 102 classifies the referring websites into classes, each of the classes having a risk rating.

In some embodiments, the risk ratings of the classes are based at least in part on a whitelist of websites.

At block 203, user identifier 104 identifies logins to access the web server and determines a user associated with each login.

In some embodiments, determining the user associated with each login is based at least in part on an IP address in a web server log.

In some embodiments, determining the user associated with each login is based at least in part on an IP address in a HTTP request.

At block 204, user identifier 104 associates each of the logins with one of the requests and the referring website for that request.

In some embodiments, associating each of the logins with one of the requests and the referring website for that request is based at least in part on comparing a time stamp of the login and a time stamp of the request.

In some embodiments, associating each of the logins with one of the requests and the referring website for that request is based at least in part on a cookie upon login linking an account of the user with a browser of the user.

At block 205, for each of the users, destination identifier 106 identifies transactions occurring within a time period from when the login was initiated.

In some embodiments, the time period is between ten and thirty minutes.

In some embodiments, the time period is twenty minutes.

At block 206, for each of the transactions occurring within the time period, destination identifier 106 associates a transaction destination of that transaction with the referring website for that login.

In some embodiments, the transaction destination of at least one of the transactions is an identification of an entity.

In some embodiments, the transaction destination of at least one of the transactions is a bank account.

At block 207, risk analyzer 108 assigns a risk rating to each of the transaction destinations based at least in part on a risk rating of the class of the associated referring website.

In some embodiments, method 200 further comprises grouping users from a common class of the referring websites and identifying, for each of the groups of users, a common transaction destination.

In some embodiments, the common transaction destination is identified from the destinations containing a common word.

In some embodiments, method 200 further comprises identifying additional transactions that send funds to one or more of the transaction destinations.

In some embodiments, method 200 further comprises, for each of the transactions, identifying a transaction type and assigning a risk rating to the transaction type based at least in part on the risk rating of the transaction destination.

It should be understood that one or more of the blocks may be performed in a different sequence or in an interleaved or iterative manner.

Figure 3:
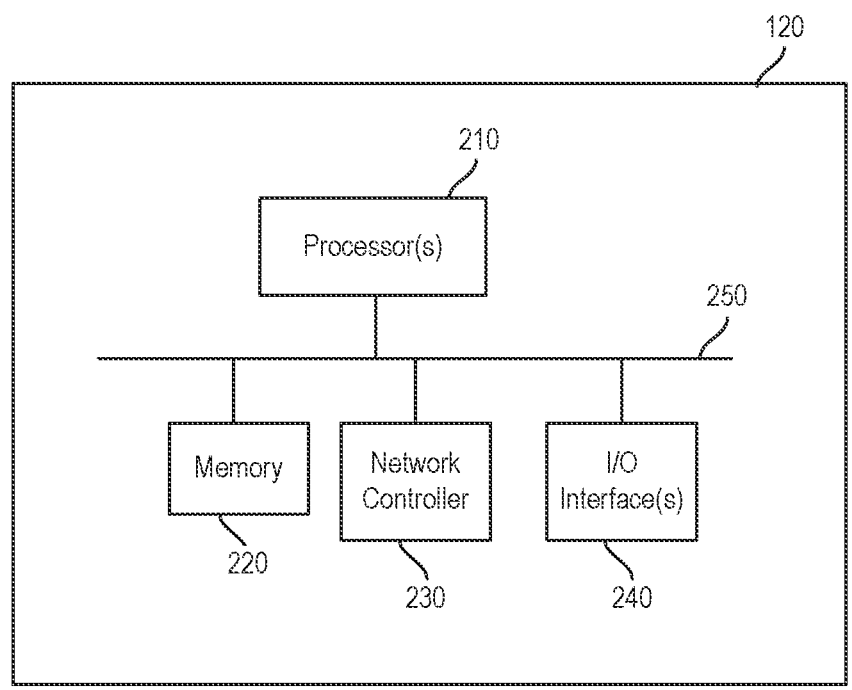
FIG. 3 is a block diagram of example hardware components of a computing device for identifying transaction destinations, according to an embodiment.

Identification system 100, in particular, one or more of site classifier 102, user identifier 104, destination identifier 106, and risk analyzer 108, may be implemented as software and/or hardware, for example, in a computing device 120 as illustrated in FIG. 3. Method 200, in particular, one or more of blocks 201 to 207, may be performed by software and/or hardware of a computing device such as computing device 120.

As illustrated, computing device 120 includes one or more processor(s) 210, memory 220, a network controller 230, and one or more I/O interfaces 240 in communication over bus 250.

Processor(s) 210 may be one or more Intel x86, Intel x64, AMD x86-64, PowerPC, ARM processors or the like.

Memory 220 may include random-access memory, read-only memory, or persistent storage such as a hard disk, a solid-state drive or the like. Read-only memory or persistent storage is a computer-readable medium. A computer-readable medium may be organized using a file system, controlled and administered by an operating system governing overall operation of the computing device.

Network controller 230 serves as a communication device to interconnect the computing device with one or more computer networks such as, for example, a local area network (LAN) or the Internet.

One or more I/O interfaces 240 may serve to interconnect the computing device with peripheral devices, such as for example, keyboards, mice, video displays, and the like. Such peripheral devices may include a display of device 120. Optionally, network controller 230 may be accessed via the one or more I/O interfaces.

Software instructions are executed by processor(s) 210 from a computer-readable medium. For example, software may be loaded into random-access memory from persistent storage of memory 220 or from one or more devices via I/O interfaces 240 for execution by one or more processors 210. As another example, software may be loaded and executed by one or more processors 210 directly from read-only memory.

Example software components and data stored within memory 220 of computing device 120 may include software to identify transaction destinations, as described herein, and operating system (OS) software allowing for basic communication and application operations related to computing device 120.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

What is claimed is:

1. A computer-implemented method for facilitating electronic financial transactions, the method performed by a web server, the method comprising:
   receiving data records representing requests for a login page of the web server, wherein the requests include HTTP requests;
   upon receiving the data records representing the requests, determining a referring website for each of the identified requests based on an HTTP referrer header of each of said requests, said HTTP referrer header including an address of said referring website;
   scanning, by a site classifier, each of said referring websites to extract keywords from each respective referring website;
   identifying, by said site classifier using natural language processing, an industry of each respective referring website;
   generating classifications for classifying the referring websites into classes based on a classification system and said industry, each of the classes having a risk rating;
   detecting data payloads representing logins to access the web server;
   upon detecting the data payloads representing the logins, determining a user identifier associated with each of the logins;
   associating each of the data payloads representing the logins with one of the identified requests and with the referring website for that identified request;
   for each of the user identifiers, determining transactions occurring within a time period from when the one of the logins was initiated;
   for each of the transactions occurring within the time period, associating an transaction destination with the referring website for that one of the logins;
   assigning a risk rating to each of the transaction destinations based at least in part on the risk rating of the class of the associated referring website; and
   permitting or blocking an electronic transaction of the transactions occurring within the time period based on the risk rating of the transaction destination associated with that transaction.

2. The computer-implemented method of claim 1, wherein the determining the referring website comprises extracting an identifier of the referring website web server logs.

3. The computer-implemented method of claim 1, wherein the associating each of the logins with one of the requests and the referring website for that request is based at least in part on at least one of:
   comparing a time stamp of the login and a time stamp of the request; or
   a cookie upon login linking an account of the user with a browser of the user.

4. The computer-implemented method of claim 1, wherein the determining the user associated with each login is based at least in part on at least one of:

an IP address in a web server log; or
   an IP address in a HTTP request.

5. The computer-implemented method of claim 1, comprising, grouping users from a common class of the referring websites and identifying, for each of the groups of users, a common transaction destination.

6. The computer-implemented method of claim 5, wherein the common transaction destination is identified from the destinations containing a common word.

7. The computer-implemented method of claim 1, wherein the time period is at least one of:
   between ten and thirty minutes; or
   twenty minutes.

8. The computer-implemented method of claim 1, wherein the risk ratings of the classes are based at least in part on a whitelist of websites.

9. The computer-implemented method of claim 1, wherein the transaction destination of at least one of the transaction is at least one of:
   an identification of an entity; or
   a bank account.

10. The computer-implemented method of claim 1, comprising at least one of:
    identifying additional transaction that send funds to one or more of the transaction destinations;
    assigning a risk rating to the additional transaction based at least in part on the risk ratings of the transaction destinations; or
    for each of the transaction, identifying a transaction type and assigning a risk rating to the transaction type based at least in part on the risk rating of the transaction destination.

11. A computer system comprising:
    a processor; and
    a memory in communication with the processor, the memory storing instructions that, when executed by the processor configure the processor to:
       receive data records representing requests for a login page of a web server, wherein the requests include HTTP requests;
       upon receiving the data records representing the requests, determine a referring website for each of the identified requests based on an HTTP referrer header of each of said requests, said HTTP referrer header including an address of said referring website;
       scan, by a site classifier, each of said referring websites to extract keyboards from each respective referring website;
       identifying, by said site classifier using natural language processing, an industry of each respective referring website;
       generate classifications for classifying the referring websites into classes based on a classification system and said industry, each of the classes having a risk rating;
       detecting data payloads representing logins to access the web server;
       upon detecting the data payloads representing the logins, determine a user identifier associated with each of the identified login;
       associate each of the data payloads representing the identified logins with one of the identified requests and with the referring website for that identified request;

for each of the user identifiers, determine transaction occurring within a time period from when the one of the logins was initiated;

for each of the transaction occurring within the time period, associate an transaction destination of that transaction with the referring website for that one of the logins;

assign a risk rating to each of the transaction destinations based at least in part on the risk rating of the class of the associated referring website; and permit or block an electronic transaction of the transaction occurring within the time period based on the risk rating of the transaction destination associated with that transaction.

12. The computer system of claim 11, wherein to determine the referring website the processor is configured to extract an identifier of the referring website web server logs.

13. The computer system of claim 11, wherein the associating each of the logins with one of the requests and the referring website for that request is based at least in part on at least one of:
the processor comparing a time stamp of the login and a time stamp of the request; or
a cookie upon login linking an account of the user with a browser of the user.

14. The computer system of claim 11, wherein the determining the user associated with each login is based at least in part on at least one of:
an IP address in a web server log; or
an IP address in a HTTP request.

15. The computer system of claim 11, wherein the processor is configured to group users from a common class of the referring websites and identifying, for each of the groups of users, a common transaction destination.

16. The computer system of claim 15, wherein the common transaction destination is identified from the destinations containing a common word.

17. The computer system of claim 11, wherein the time period is at least one of:
between ten and thirty minutes; or
twenty minutes.

18. The computer system of claim 11, wherein the risk ratings of the classes are based at least in part on a whitelist of websites.

19. The computer system of claim 11, wherein the transaction destination of at least one of the transaction is at least one of:
an identification of an entity; or
a bank account.

20. The computer system of claim 11, wherein the processor is configured to at least one of:
identify additional transaction that send funds to one or more of the transaction destinations;
assign a risk rating to the additional transaction based at least in part on the risk ratings of the transaction destinations; or
for each of the transaction, identify an transaction type and assigning a risk rating to the transaction type based at least in part on the risk rating of the transaction destination.

21. A non-transitory computer-readable medium having computer executable instructions stored thereon for execution by a computing device, that when executed perform a method comprising:
receiving data records representing requests for a login page of a web server, wherein the requests include HTTP requests;
upon receiving the data records representing the requests, determining a referring website for each of the identified requests based on an HTTP referrer header of each of said requests, said HTTP referrer header including an address of said referring website;
scanning, by a site classifier, each of said referring websites to extract keywords from each respective referring website;
identifying, by said site classifier using natural language processing, an industry of each respective referring website;
generating classifications for classifying the referring websites into classes based on a classification system and said industry, each of the classes having a risk rating;
detecting data payloads representing logins to access the web server;
upon detecting the data payloads representing the logins, determining a user identifier associated with each of the logins;
associating each of the data payloads representing the logins with one of the identified requests and with the referring website for that identified request;
for each of the user identifiers, determining transaction occurring within a time period from when the one of the logins was initiated;
for each of the transaction occurring within the time period, associating an transaction destination of that transaction with the referring website for that one of the logins;
assigning a risk rating to each of the transaction destinations based at least in part on the risk rating of the class of the associated referring website; and
permitting or blocking an electronic transaction of the transaction occurring within the time period based on the risk rating of the transaction destination associated with that transaction.

* * * * *